(12) United States Patent
Brunet

(10) Patent No.: US 6,742,972 B2
(45) Date of Patent: Jun. 1, 2004

(54) CLUTCH CONTROLED LOAD-SECURING STRAP TENSIONING SYSTEM FOR TRAILER

(76) Inventor: André Brunet, 111 rue Beaudry, Amos (CA), J9T 3E3

( * ) Notice: Subject to any disclaimer, the term of this patent is extended or adjusted under 35 U.S.C. 154(b) by 0 days.

(21) Appl. No.: 09/925,494

(22) Filed: Aug. 10, 2001

(65) Prior Publication Data

US 2003/0031524 A1 Feb. 13, 2003

(51) Int. Cl.⁷ ................................................ B60P 7/08
(52) U.S. Cl. ........................ 410/103; 410/100; 410/104
(58) Field of Search ............................ 410/12, 97, 100, 410/103, 104; 248/499; 254/217, 219, 223, 241, 243, 295, 299, 306, 317, 320, 346, 352, 365, 369, 376; 24/695 T, 68 CD, 265 CD

(56) References Cited

U.S. PATENT DOCUMENTS

| | | | | | |
|---|---|---|---|---|---|
| 2,773,700 | A | * | 12/1956 | Lasswell | 410/36 |
| 2,946,563 | A | | 7/1960 | Eaton | |
| 2,991,975 | A | | 7/1961 | Alexander | |
| 3,428,331 | A | * | 2/1969 | Morgan et al. | 410/100 |
| 4,382,736 | A | * | 5/1983 | Thomas | 410/104 |
| 4,995,776 | A | * | 2/1991 | Kato | 410/100 |
| 5,118,232 | A | | 6/1992 | Shuker | 410/98 |
| 5,145,299 | A | * | 9/1992 | Stephenson, Jr. | 410/100 |
| 5,234,298 | A | | 8/1993 | Shuker | 410/98 |
| 5,441,371 | A | * | 8/1995 | Erke | 410/100 |
| 5,664,918 | A | * | 9/1997 | Heider et al. | 410/103 |
| 5,791,844 | A | * | 8/1998 | Anderson | 410/103 |
| 6,015,250 | A | * | 1/2000 | Walsh et al. | 410/100 |
| 6,250,861 | B1 | * | 6/2001 | Whitehead | 410/100 |
| 6,350,088 | B1 | * | 2/2002 | Priester | 410/103 |

* cited by examiner

Primary Examiner—Stephen T. Gordon
(74) Attorney, Agent, or Firm—Francois Martineau

(57) ABSTRACT

A strap winch device assembly for fitting on a flat bed open truck trailer, to enable a truck driver to remote actuate this load tightening system without leaving his truck cab, in periodic fashion. A number of these winch devices are connected to a single fore and aft drive shaft, which extends along the side of the trailer. The drive shaft is driven by a motor to tighten any straps that loosen when the trailer is in motion over the road, as trailer load distribution typically shifts during road trailer, due to road-induced vibrations. A clutch mechanism is provided in the winch device, to prevent the motor from overheating once a set tightening torque threshold level has been reached.

19 Claims, 13 Drawing Sheets

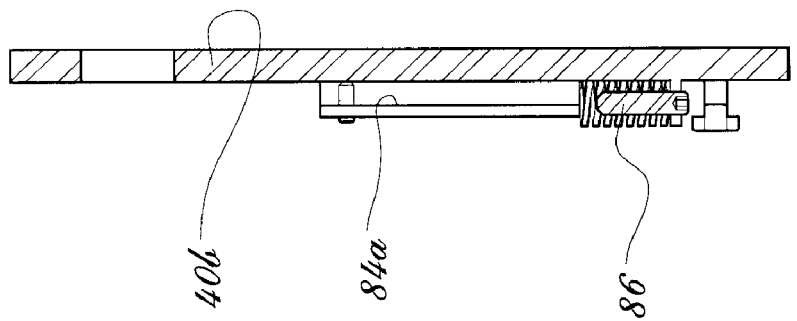
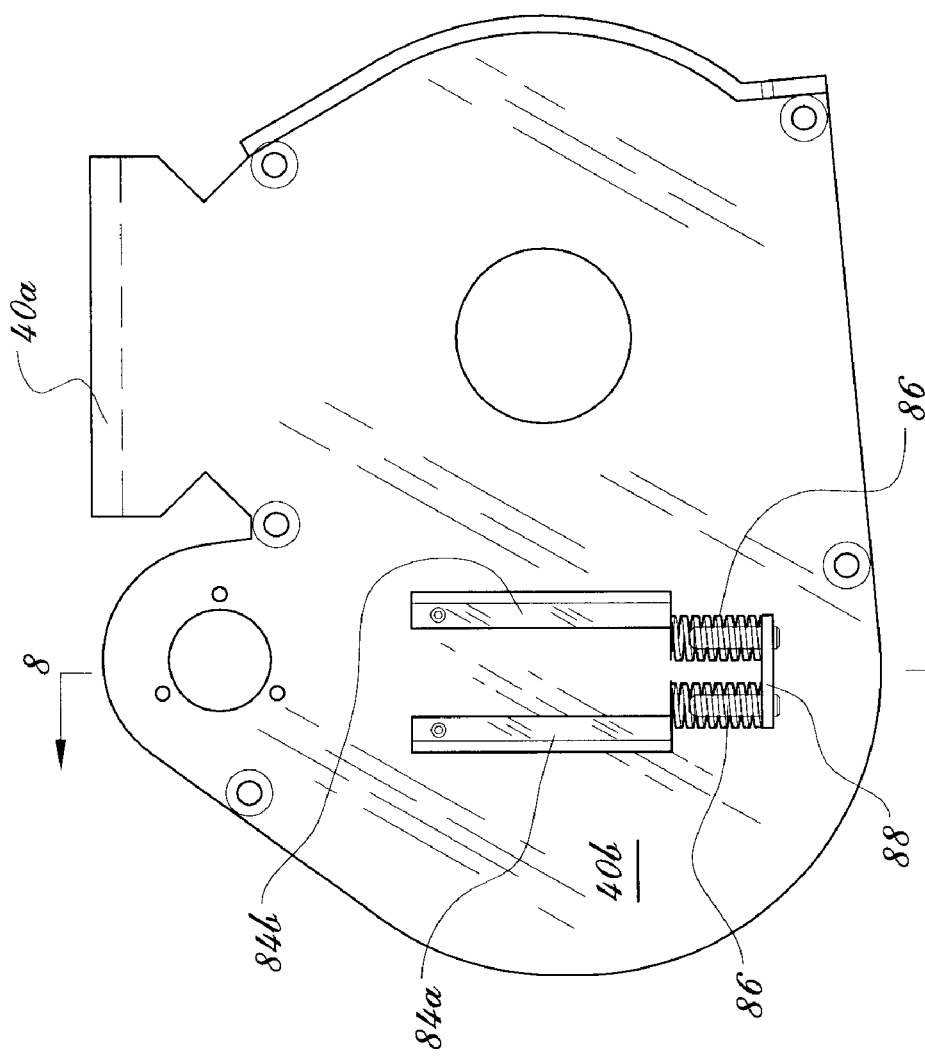

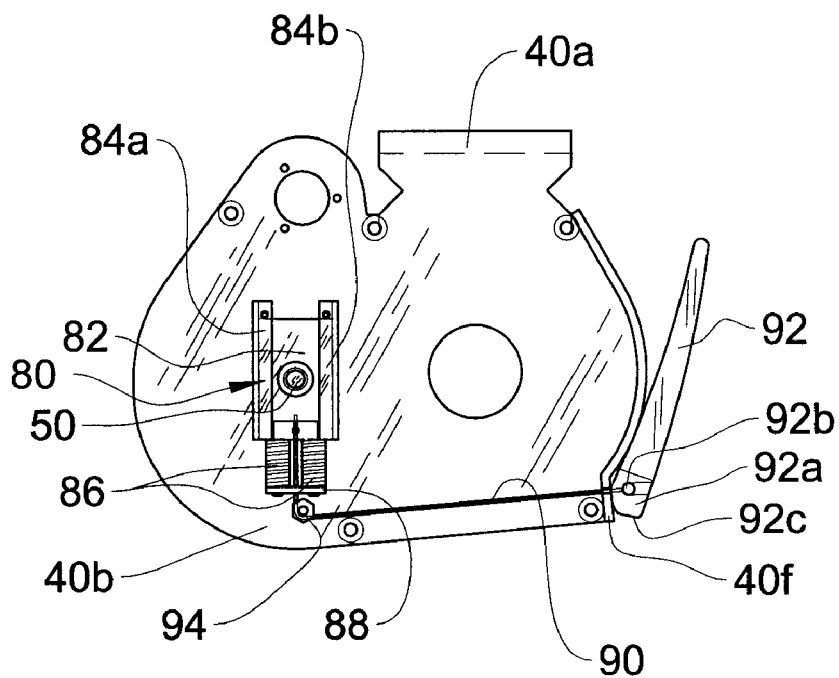
Fig. 13
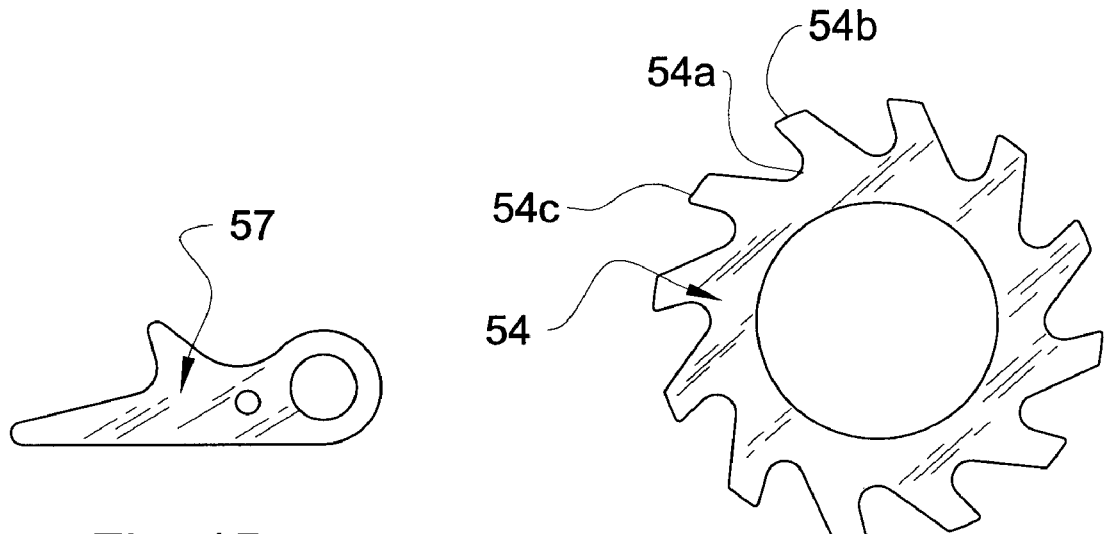
Fig. 15
Fig. 14

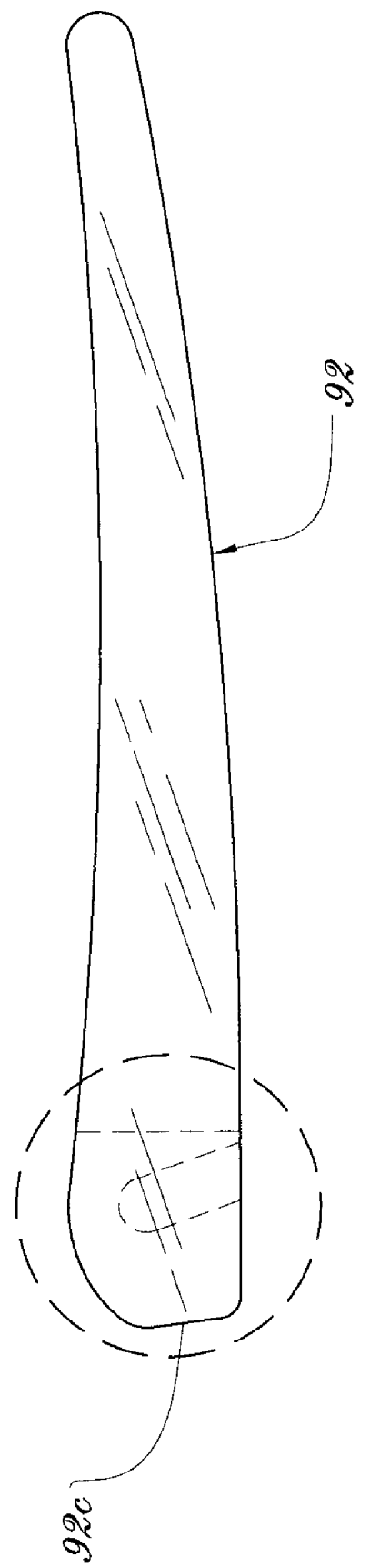

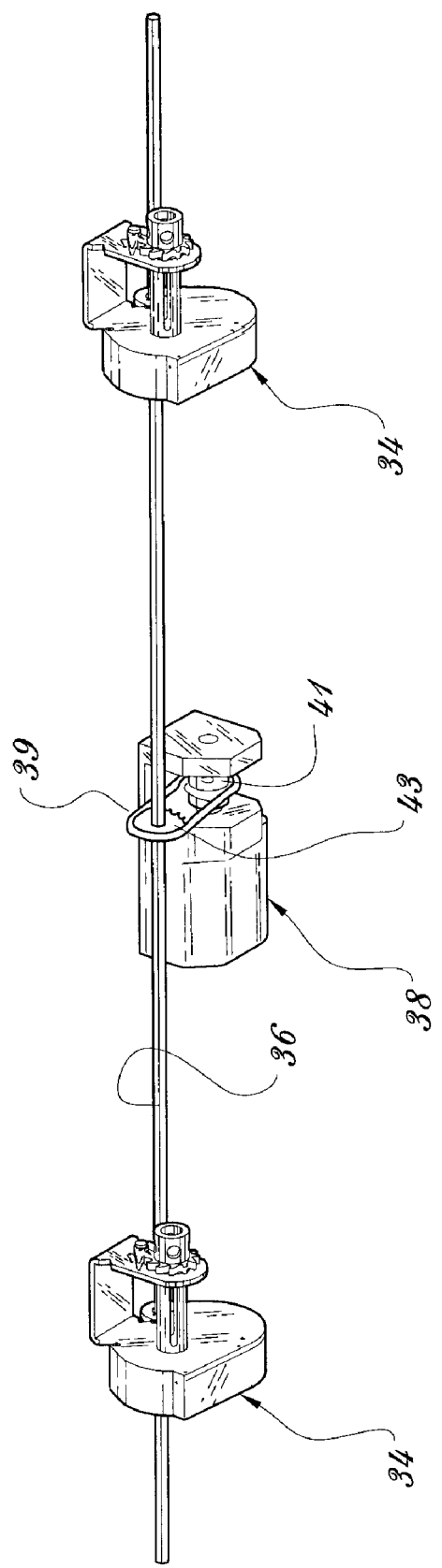

CLUTCH CONTROLED LOAD-SECURING STRAP TENSIONING SYSTEM FOR TRAILER

FIELD OF THE INVENTION

The invention relates to quick load binding systems for securing and maintaining loads to a truck having an open flat bed surface.

BACKGROUND OF THE INVENTION

During road shipping of goods on an open flat-bed trailer, a strap tightening system is required—and is compulsory under government regulations—to maintain the load in place over the trailer flat-bed. Loads on open trailers can be conventionally held in place by wrap-around straps, extending transversely over the load and spaced from one another in a fore and aft direction. Each of these straps is tightened in place by a corresponding winch. However, due to the road bumps, there is a tendency for the load distribution to shift during road travel, and therefore, the transverse wrap-around straps become loosened, so that the strap tensioning force applied on the load becomes insufficient. Periodically after each half hour or so, the truck driver must pull his truck on the side of the road and stop his truck, get out and manually tighten with an elongated one-meter long lever bar once again the flexible strap with a winch. Typically, the applied tensioning load will be about two metric tons for each 10 centimeters wide straps. The lever bar engages through a bore at the free end of the winch shaft.

Such a conventional load tightening system is physically demanding for the truck driver, with eventual back pain injuries that can follow after a while. It is inconvenient for the truck driver, when the weather is bad: heavy rain, ice or snow. During road travel, it generates anxiety with the truck driver, as the latter is never sure when exactly the load needs to be re-tightened; also it may take some time before the next upcoming suitable road side space becomes available for temporarily parking the trailer to check the tightening of the load, thus again generating nervousness in the truck driver never knowing if part of his load will accidentally release the flat-bed of his trailer and undesirably fall down onto the road, before he can reach the next upcoming curbside road park space. Morever, such a load tightening system does constitute a safety hazard for both this truck driver and incoming motorists, because he has to work on the side of the road, sometimes at night, with an elongated bar projecting away from the truck and across the road where incoming motorists may not see the truck driver. Also, such a load tightening system is unreliable since it does not enable the truck driver to uniformly adjust the proper tensioning for each and every strap during road travel. Also, because there are usually around twelve (12) such transverse straps and strap tensioners on a typical flat bed open trailer, and the truck driver needs to crank each strap winch individually, load tightening is a tiresome and lengthy business.

OBJECTS OF THE INVENTION

An object of this invention is to enhance operational safety of flat bed open trailers.

Another object of this invention is to tighten in a single operation all strap winches of a flat bed trailer.

Another object of the present invention is to increase efficiency of operation of flat bed open trailers.

Another object of this invention is to reduce the likelihood of work related bodily injuries by truck drivers.

SUMMARY OF THE INVENTION

In accordance with the objects of the invention, there is disclosed a strap winch device assembly for fitting to a truck trailer, to periodically tighten the load supported by the open trailer. This load tightening can be performed either automatically, at set intervals (for example regular intervals), or remotely by the truck driver without having to leave his driving cabin. A number of these winch devices are connected to a single fore and aft drive shaft, which is rotatably carried by and extends along the side of the trailer. The drive shaft is driven by a motor to tighten any straps that loosen when the trailer is in motion over the road. Trailer load distribution typically shifts during road travel, due to road-induced vibrations.

More particularly, the present invention introduces a pneumatic system for automatically—or by remote control—providing tightening load on the wrap-around straps, so that the trucker does not need to periodically stop on the side of the road, and get out of his cab, to manually re-tighten his load with the straps. To the winch cable tightening system, there is added an elongated shaft which extends along the side of the full length of the trailer, and which drivingly engages a pneumatic motor at the front end of the trailer. This motor is periodically activated during road travel, for short durations each time. This can be done either automatically, at set intervals, or by remote control, at the discretion of the truck driver inside his cab. Upon reaching shipping destination, some of these cable tightening assemblies corresponding to the registering load units to be unloaded, are released manually by a clutch release handle.

This strap tensioning system includes an integral tension limiter, that constantly maintains the tension on the load-tightening straps, contrarily to conventional manual load tightening systems. The automatic tightening system operates thanks to a safety ratchet member, including a locking pawl, to maintain the tightening load without having to continuously maintain in operation the drive motor.

The tightening system mechanism includes three different gear wheels. One gear wheel is located on the drive shaft, the second gear wheel is located on the drum, and the third and last gear wheel interconnects the first and second gear wheels. The third gear wheel is provided with a spring biased system which becomes inoperative when the required tensioning force is reached. This same gear wheel also enables the user to deactivate the drum of the drive shaft with the clutch release arm, to alternately enable a manual operation or the dismantling of the straps.

Also, the strap tensioning devices are slidingly mounted along the elongated motor shaft, so that their relative fore and aft position along the trailer flat bed can be adjusted to fit any type of load. The transmission shaft is for example cross-sectionally hexagonal, but other suitable shapes, most preferably polygonal, or other configurations, e.g. a knurled surface on an otherwise cylindroid shaft, could be used provided they allow transmission of power from the motor to the tightening devices.

More particularly, the invention relates to a strap tightening system for use in securing a load with a wrap-around strap over a flat bed open trailer, said system comprising:

at least one strap tensioning unit, including: a) a main frame, to be mounted to the trailer; b) a strap winding member, rotatably mounted to said main open frame and lockingly engageable by one end portion of the strap; c) a gear assembly, rotatably mounted to said main open frame; a motor, to be mounted to the trailer at a distance from said tensioning unit and to be connected to a power supply;

a drive shaft, operatively interconnecting said tensioning unit gear assembly and said motor, said drive shaft bringing said strap winding member to rotate upon actuation of said motor;

a clutch assembly, operatively interconnecting said gear assembly and said cable winding member, wherein upon the load applied by the tightening strap onto said cable winding member exceeding a set threshold, said clutch assembly disconnects said gear assembly from said cable winding member.

A manual clutch release member may be added, for manually disconnecting said gear assembly from said cable winding member. A manual strap tightening device could also be added, being associated with said strap winding member, for tightening said strap independently of said drive shaft. A rail member could also be added, said rail member including a first portion, to be anchored to the trailer flat bed in a fore and aft direction, and a second portion, slidingly retaining said strap tensioning unit open frame, wherein the relative position of said strap tensioning unit device can be slidingly adjusted along the length of the trailer in accordance with the relative position on the trailer bed of the load to be secured.

It would also be envisioned to add a safety ratchet and pawl assembly, mounted to said main frame and cooperating with said strap winding member, said safety ratchet and pawl assembly preventing said strap winding member from unwinding once said motor is deactivated.

There may be at least a few strap tensioning units, and preferably between eight and fourteen (8–14), located spacedly from one another and adjustable movable relative to one another along said rail member.

The invention also relates to the combination of the open trailer per se and the strap tightening unit.

The invention also relates to a method of securing a load on a flat bed trailer with at least one strap tightening unit, the strap tensioning unit of the type having a main frame, to be mounted to the trailer, a strap winding member, rotatably mounted to the main open frame and lockingly engageable by one end portion of the strap, a gear assembly, rotatably mounted to said main open frame, and a clutch assembly, operatively interconnecting said gear assembly and said cable winding member; wherein said method comprises the following steps: a) extending the strap transversely over a selected portion of the trailer load carrying bed; b) engaging an inner end portion of the strap around said strap winding member; c) applying a rotational force on said strap winding member to tighten said strap against the load on the trailer bed; d) allowing said clutch assembly to disconnect said gear assembly from said cable winding member, once the load applied by the tightening strap onto said cable winding member exceeds a set threshold; e) locking said cable winding member at its threshold load with a lock member; f) releasing said rotational force on said strap winding member.

The following additional step (aa) could intervene before said step (a): adjusting the position of said strap tensioning unit along the trailer, to register with the load on the trailer bed. Also, there could be a number of such said strap tensioning units; so that the following additional step would be involved in this method, intervening between said steps (aa) and (a): adjusting the position of the other said strap tensioning units relative to one another, to adapt to the load distribution on the trailer bed.

The invention also relates to a load tightening device for use in securing a load with a wrap-around flexible strap over a flat bed trailer, said device comprising: a main rigid frame, to be anchored to the trailer; a winding member, rotatably mounted to said main frame and to be connected to the load securing strap for winding the latter; power means, for power operating said winding member to wind the strap; power transmission means, operatively interconnecting said winding member and said power means; clutch means, deactivating said power transmission means once the torque applied by the tightening strap onto said strap winding member exceeds a set threshold and said strap winding member reaches a threshold winded state; and lock means, maintaining said strap winding member in its threshold winded state once said power means is deactivated.

Said gear assembly could include a ring gear, a drive gear integral to said drive shaft and intermeshing with said ring gear; and wherein said clutch assembly includes a clutch casing, mounted radially inward of said ring gear, said clutch casing including a number of radial recessses, a biasing member fully engaged into each of said radial recesses, and a bearing member mounted into each of said radial recesses radially outwardly of said biasing member, said ring gear defining a radially inner edge portion having a number of cavities in register with corresponding said radial recesses, each of said ring gear cavities sized to complementarily accommodate a fraction of a corresponding bearing member, each said bearing member biased by a corresponding one of said biasing members radially outwardly toward and against a corresponding one of said ring gear cavities, said set load threshold being a function of said biasing member.

There could also be added load adjusting set screws, each of said set screws mounted into a corresponding one of said radial recesses radially inwardly of said biasing member, said set screws enabling an operator to manually adjust said set load threshold.

Preferably, the range of said set load threshold is between about 1360 and 2270 kg, most preferably of about 1810 kg.

BRIEF DESCRIPTION OF THE DRAWINGS

FIG. 7 is a plan view of part of the load tensioning device, with the gear assembly removed;

FIG. 8 is a cross-sectional view taken along line 8—8 of FIG. 7;

FIG. 13 is a view similar to FIG. 7 but further showing the clutch release assembly with the handle clutch in its released condition;

FIG. 14 is a plan view of the safety ratchet;

FIG. 15 is a plan view of the ratchet pawl for edgewise engagement with the ratchet of FIG. 14;

FIG. 17 is a plan view of the clutch release handle. and

FIG. 18 is a schematic view of the drive shaft showing the drive motor mounted intermediately in between two load tensioning units.

DETAILED DESCRIPTION OF THE PREFERRED EMBODIMENT OF THE INVENTION

Figure 1:
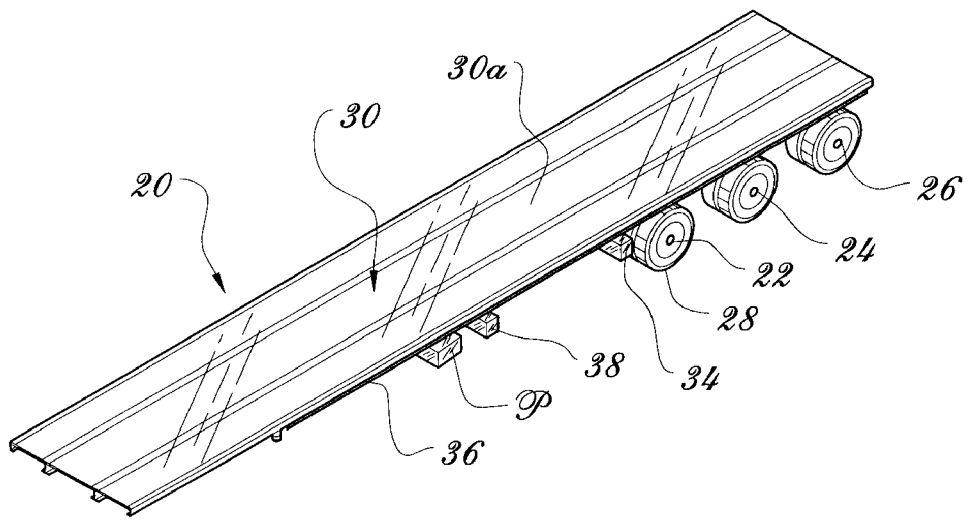
FIG. 1 is a perspective view of a three-axle trailer, fitted with a load tensioning system according to a preferred embodiment of the invention.
Figure 2:
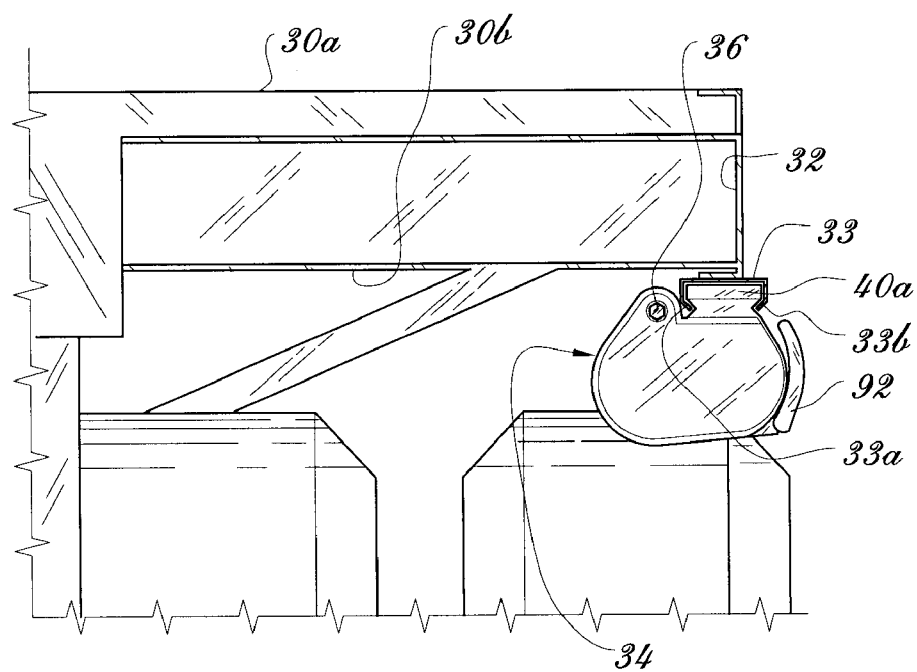
FIG. 2 is a cross-sectional view of an intermediate section of the trailer, at an enlarged scale relative to FIG. 1, showing the load tensioning device housing fitted along the lateral edge of the trailer platform bed underface.

In FIGS. 1 and 2 of the drawings, there is shown a flat-bed trailer 20 of the open type, i.e. with no side walls, tail gate or ceiling. Trailer 20 is adapted to be towed by a truck (not shown) at the front end thereof. Trailer 20 includes for example three axles 22, 24, 26, with ground supporting end wheels 28 at the rear end portion of the trailer. A flat bed 30 enables support of a load of commercial articles on the top surface thereof, 30a. A reinforced iron angle 32 is mounted on each lateral side edge of the flat bed 30, joining the top surface 30a to the underface 30b of the flat bed 30. A fore and aft extending rail 33 is preferably anchored to the underface of one iron angle 32. Rail 33 includes downturned laterally opposite flanges or lips 33a, 33b. Lips 33a, 33b, are slightly inwardly inturned, as shown.

Figure 11:
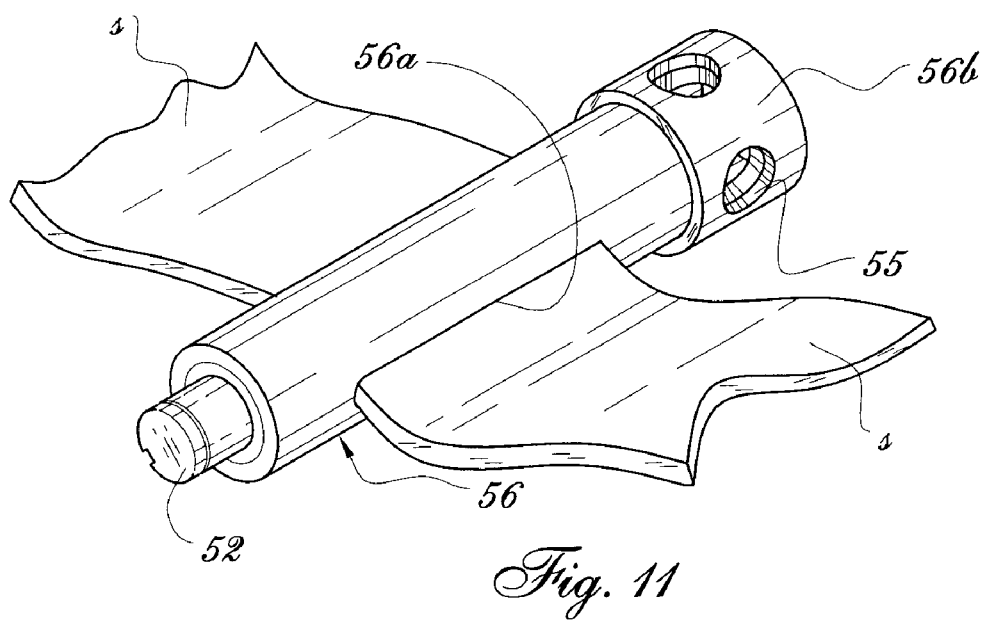
FIG. 11 is a perspective view of the tensioning strap engaging arm.

In accordance with the teachings of the invention, there is provided at least one strap tightening device 34, being mounted slidingly into rail 33. The straps s (FIG. 11) are destined to be anchored at one end to an anchor point on one lateral side of the trailer flat bed, and to be connected to the strap tightening device 34 at the opposite end thereof. Preferably, there are at least a few such tightening devices 34, 34, 34, . . . being positioned in fore and aft register and spaced fashion relative to one another on the same lateral side edge of the trailer. An elongated rotatable shaft 36 extends through and joins all these tightening devices to one another. As shown in FIG. 18, a motor, preferably an electric motor 38, is mounted at an intermediate section of the trailer in fore and aft register with the shaft 36. Electric motor 38 is connected to a power supply P, for example electrically connected to the alternator of the truck by electrical line, not illustrated, or to a 12 volts battery P. Shaft 36 engages with the motor 38 via an endless chain 39 meshing with a first gear 41 rotatably integral to a motor drive shaft, and with a second gear 43 rotatably integral to shaft 36. The cross-section of shalt 36 should preferably be polygonal, most preferably hexagonal, to enable transmission of power from the motor 38 to the tightening devices 34; but other alternate securing means could also be provided, e.g. knurling of the outer surface of the shaft 36, although this may be less effective or shorter lasting.

Figure 3:
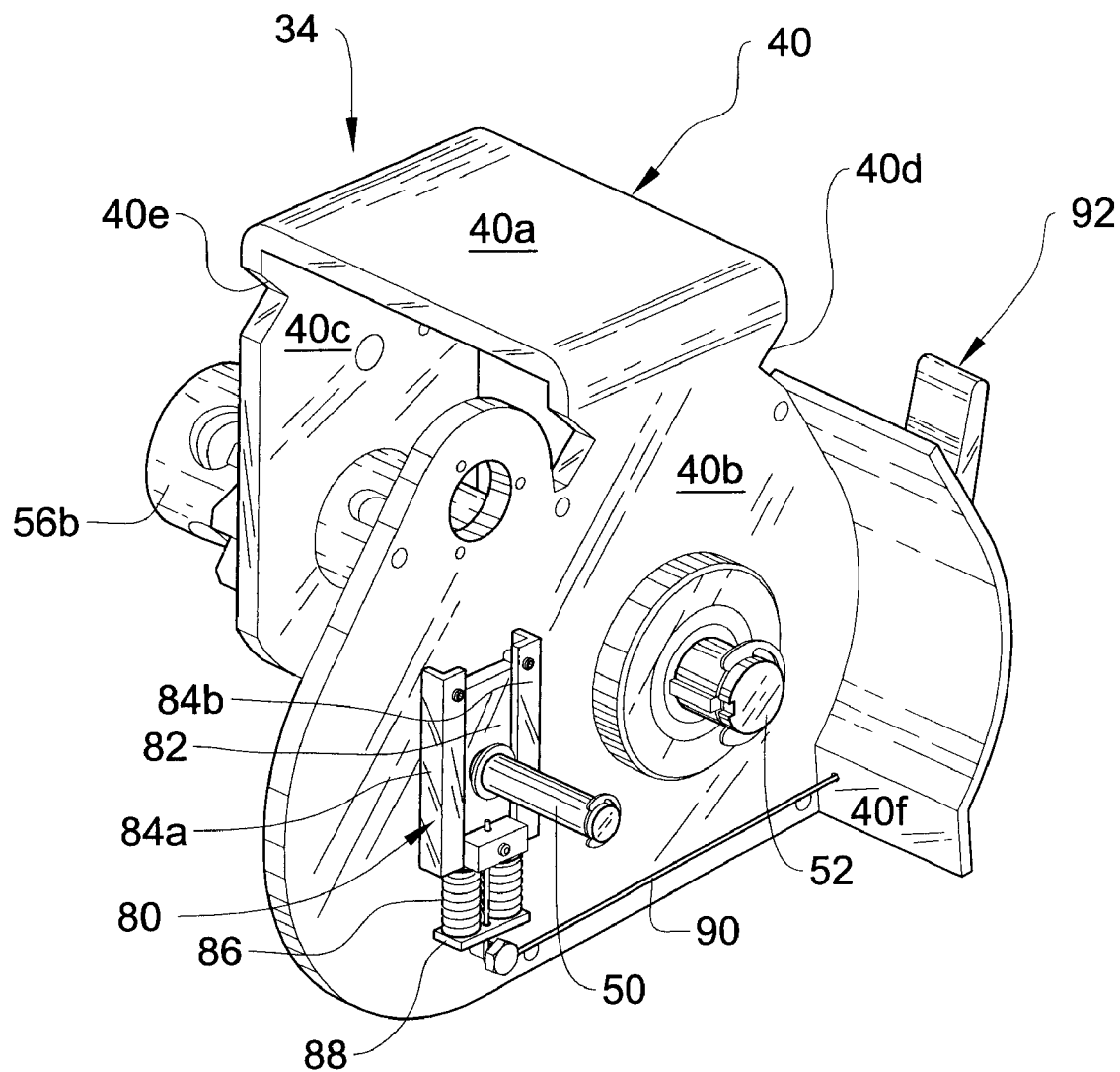
FIG. 3 is an enlarged perspective view of the load tensioning device, with the gear wheels removed for clarity of the view.
Figure 5:
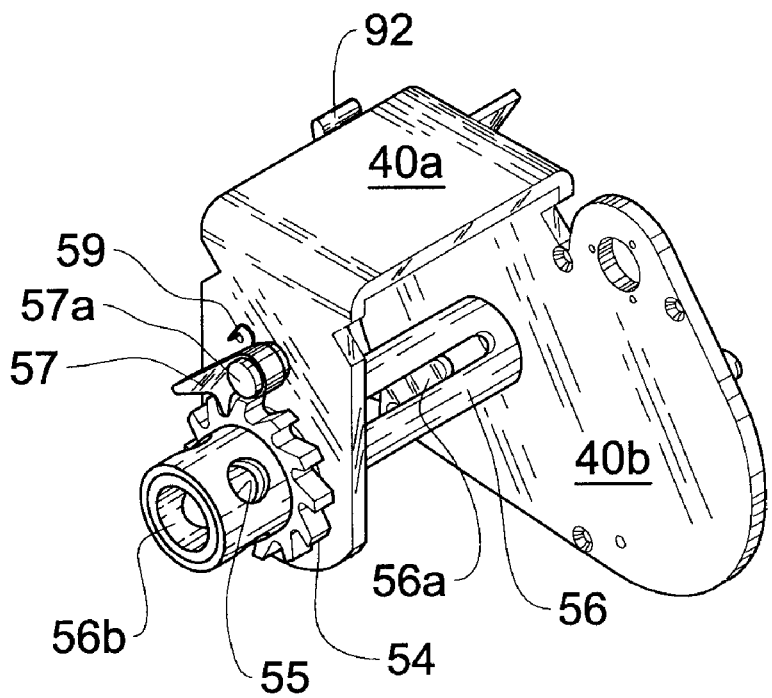
FIG. 5 is another perspective view of the load tensioning device of FIG. 4, but from another side thereof compared to FIG. 4.
Figure 4:
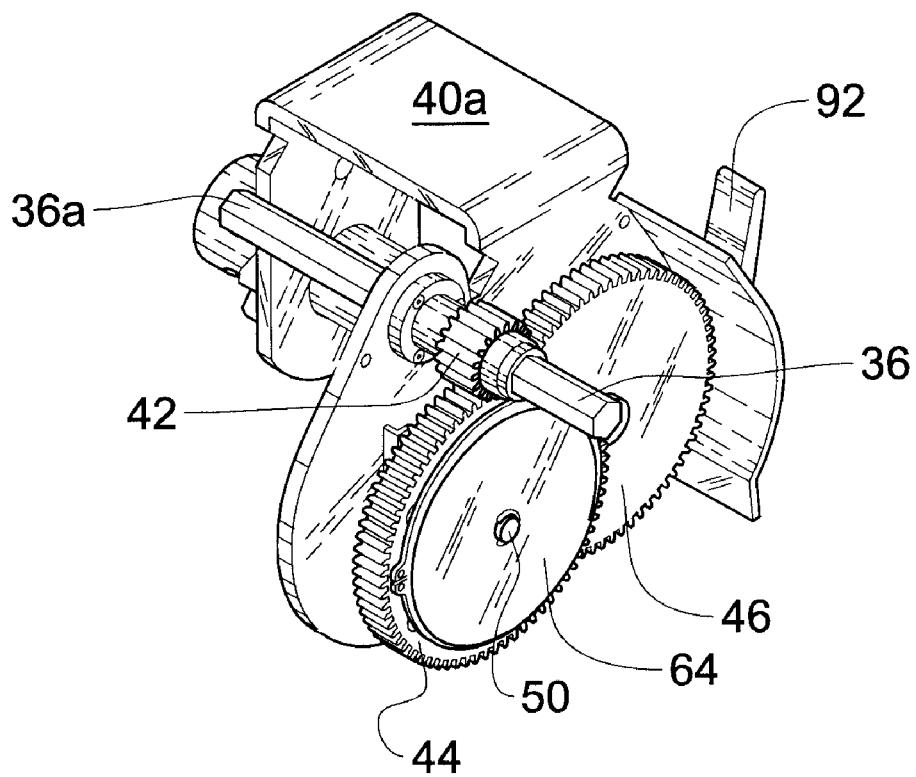
FIG. 4 is a view similar to FIG. 3, but at a smaller scale and further showing two gear wheels and the tensioning ring gear.

As illustrated in FIGS. 3 to 5 of the drawings, the strap tightening device 34 includes a generally U-shape open main frame 40, defining a web leg 40a and two side legs 40b, 40c. Web leg 40a is sized to slidingly fit inside and be retained by cross-sectionally U-shape rail 33 of trailer 20, as suggested in FIG. 2 of the drawings. The portion of frame legs 40b, 40c, adjacent web leg 40a, form narrowed necks 40d, 40e, respectively, to slidingly accommodate the inturned lips 33a, 33b, of the trailer rail 33, so as to enable the rail lips 33a, 33b, to support tensioning unit 34 freely over ground. Accordingly, the main frame web leg 40a is preferably sized and shaped for sliding fore and aft engagement with rail element 33. Alternately, leg 40a and rail 33 could be integral to one another, although the sliding adjustment capability is preferred for convenience of the user.

Gear wheels 42, and ring gear 44, are rotatably mounted to the exterior face of main frame leg 40c by axles 36a, 50, respectively, while another gear wheel 46 is rotatably mounted to the same exterior face of main frame leg 40c by a shaft 52. Shaft 50 is an idle rotatable shaft. Another gear wheel 54 is rotatably mounted to the exterior face of main frame leg 40b by a strap tensioning shaft 56. Shaft 56 is coaxial and integral to shaft 52, and diametrally larger relative thereto, and includes a lengthwise slit 56a for locking insertion engagement by one end portion of a load-tightening strap (not shown).

Diametrally smallest drive gear wheel 42 meshes with diametrally larger ring gear 44 in the same plane, whereas diametrally larger gear wheel 46 is offset from the plane of gears 42 and 44. Moreover, another small gear wheel 74 (FIG. 9) associated with ring gear 44, meshes with gear wheel 46 and is coplanar therewith. Ratchet gear 54 is coaxially mounted to shaft 56 integral thereto.

Rotation of gear wheel 54 opposite gears 42–46, is controlled by a pawl 57 rotatably mounted to main flame kg 40 b by a pivotal pin 57a. Pawl 57 registers tangentially with and is coplanar to gear 54, and is adapted to engage a selected one of the peripheral recesses 54a (FIG. 14) formed between a successive pair of teeth 54b, 54c, of gear 54, so that gear 54 and pawl 57 form together a ratchet assembly.

Preferably, the outer end portion 56b of tensioning shaft 56 is enlarged and includes one or two radial through channels 55, for through engagement by a section of an elongated tubular lever bar (not shown), for alternate manual rotation of the tensioning shaft 56 for enabling release of tensioning when unloading is required; also, should motor 38 become defective or should a component of the tightening unit 34 break.

The axle 36a of diametrally smallest gear 42 is formed by a segment of the cross-sectionally polygonal drive shaft 36, that brings power from the front motor 38 to the main ring gear 44 via intermeshing gear wheel 42.

Figure 6:
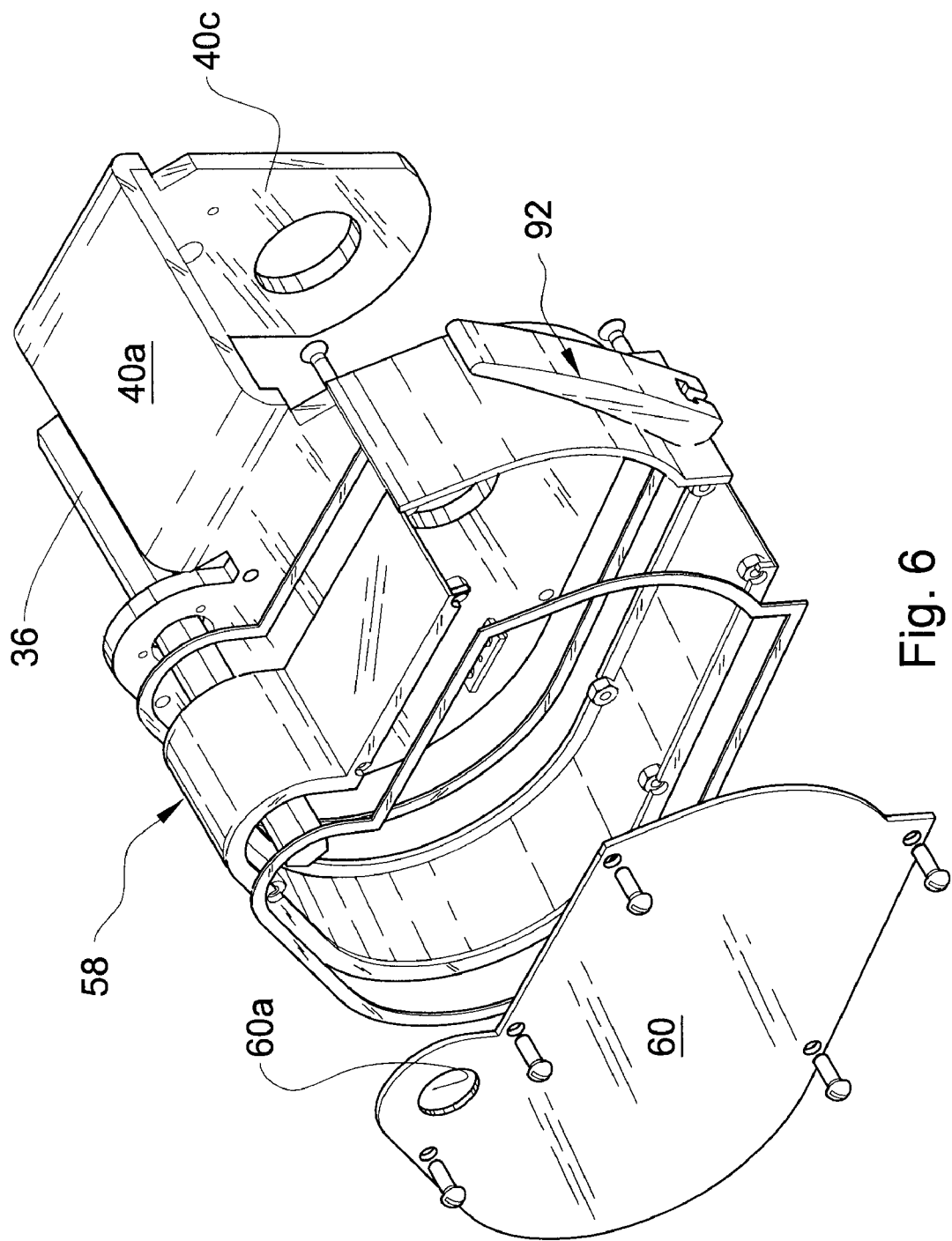
FIG. 6 is an exploded view of the housing enclosing the gear assembly of the load tensioning device.

As illustrated in FIG. 6, the gears 42, 46, 74, and ring gear 44 are preferably rotatably sealed inside a closed weather-proof casing 58. The cover 60 of casing 58 includes a bore 60a for free rotatable passage of the cross-sectionally polygonal drive shaft 36.

Figure 9:
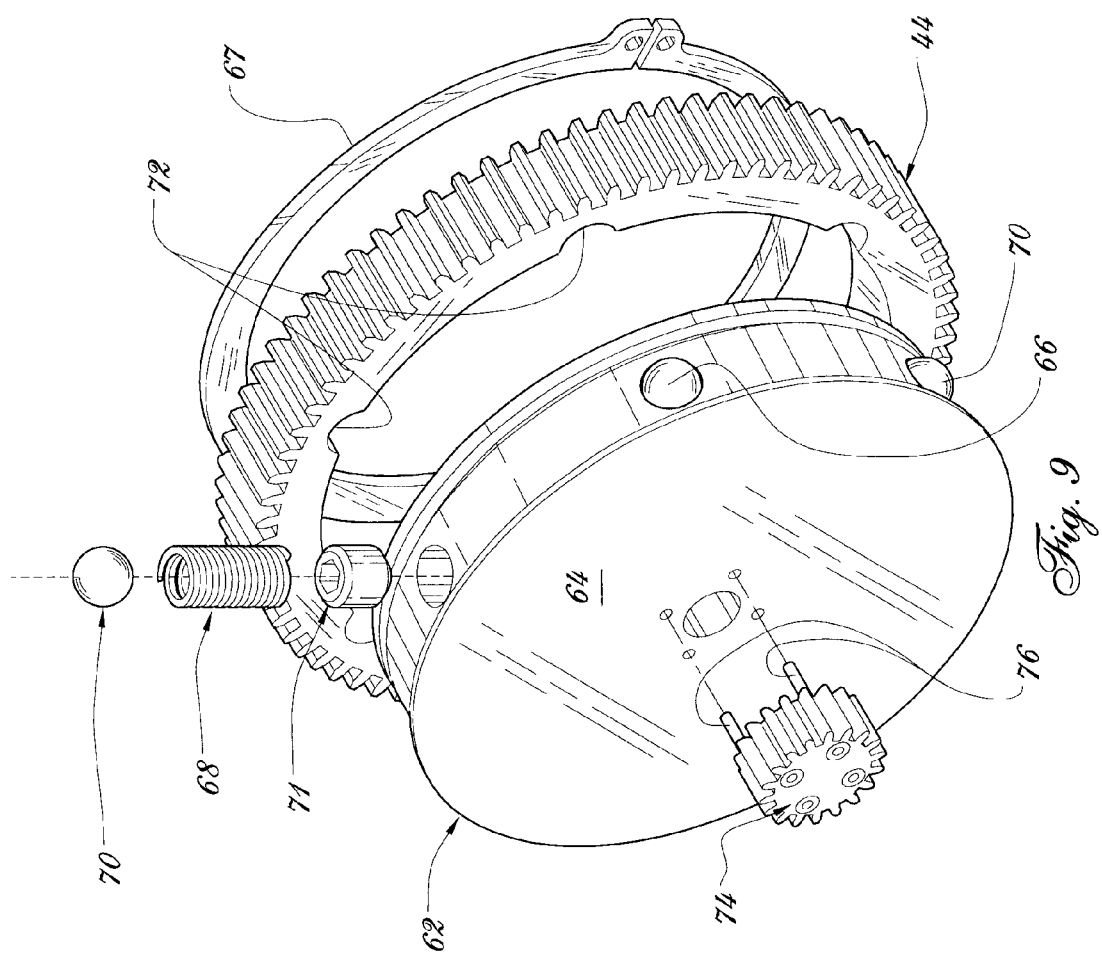
FIG. 9 is an enlarged perspective view of the clutch member forming pan of the present load tensioning device.
Figure 10:
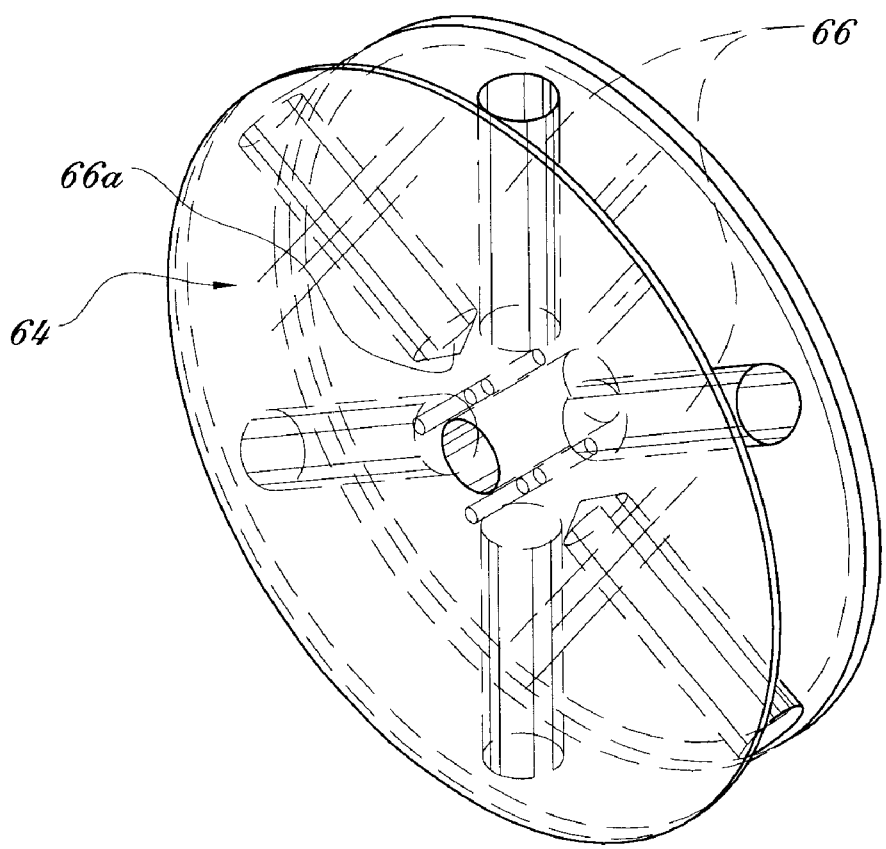
FIG. 10 is a perspective view of the spring discoid support forming part of the clutch member of FIG. 9, showing in phantom lines the radial cavities for receiving the biasing coil springs.
Figure 12:
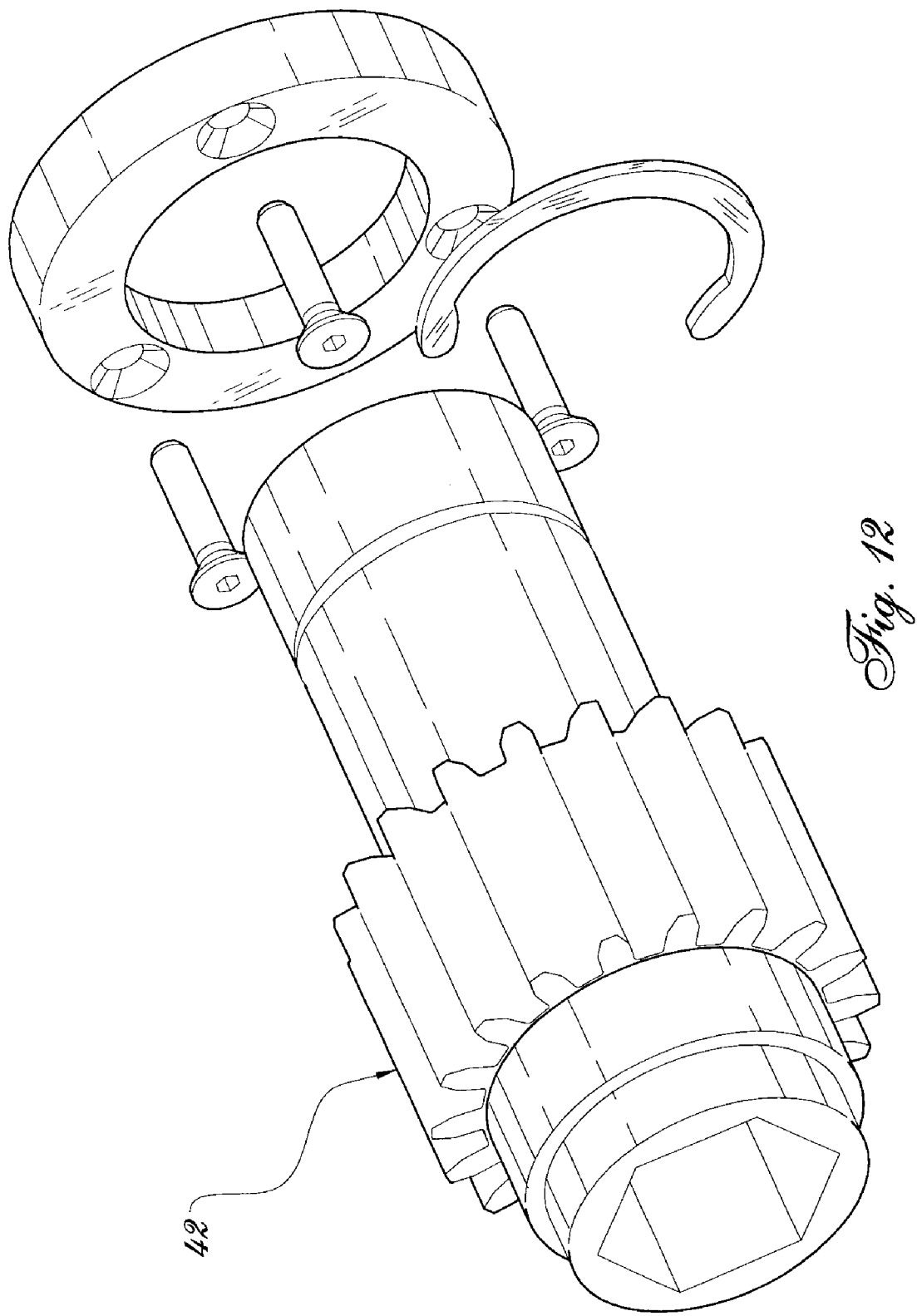
FIG. 12 is a perspective view of the drive gear assembly.
Figure 16:
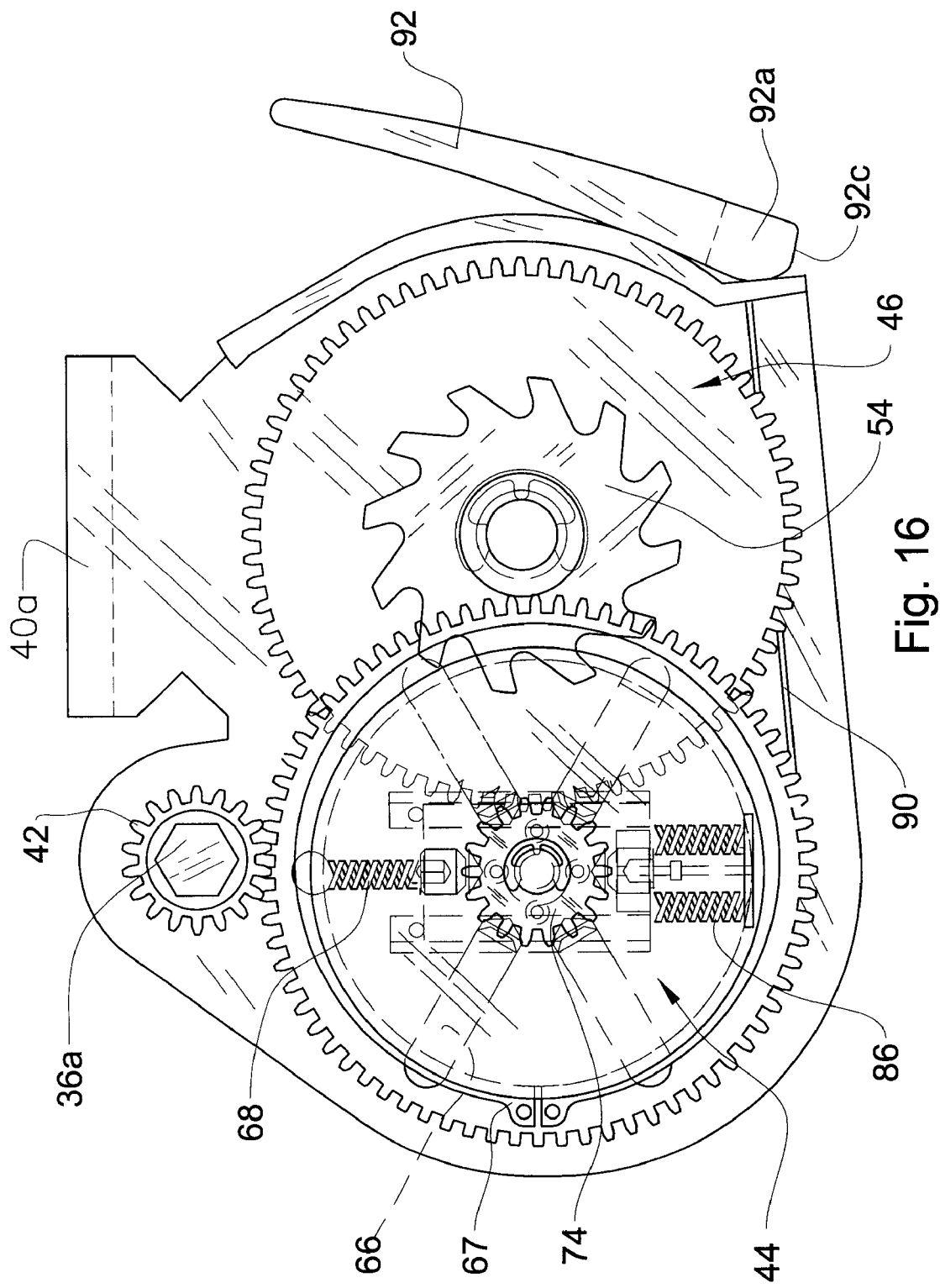
FIG. 16 is a plan view of the tightening device, suggesting in see-through fashion how the various gear wheels interact with one another.

As shown in FIGS. 9–10 and 16, a clutch assembly 62 is mounted radially inwardly of ring gear 44. Clutch assembly 62 includes a discoid casing 64 having a number of deep cylindroid radial recesses 66. Casing 64 may be for example about 30 cm in diameter and between 15 and 35 cm in thickness. Recesses 66 may be conical at their radially inner end 66a. Casing 64 is sized to fit snugly radially inwardly of ring gear 44. Casing 64 may be constructed as a hollow wheel, with a diametrally smaller rim flanked by opposite rim flanges. A C-shape retaining ring 67 interlocks ring gear 44 and clutch casing 64, by wedging. A coil spring 68 extends fully into each radial recess 66. A free spheroid steel body 70, e.g. of about 13 mm in diameter, is mounted at the radially outward end of the coil springs 68, and a hexagonal socket set screw 71 is mounted at the radially inward end of each radial recess 66. Set screws 71 are complementarily shaped to the radially inner conical end 66a of radial recesses 66. Shallow arcuate recesses 72 are provided on the radially inward face of ring gear 44, in register with corresponding radial recesses 66 of discoid casing 64 when fitted therein. Each hemispheric recess 72 is sized to snugly receive a half section of a corresponding spheroid body 70. The size of the steel balls 70 is a function of the diameter of the ring gear 44. A small gear wheel 74 is anchored by anchor screws 76 flatly against discoid casing 64 coaxially thereto. Gear wheel 74 is coplanar to and meshes with tensioning gear 46. Stationary pivot axle 50 rotatably support both ring gear 44—via clutch casing 64—and gear 74.

It can now be understood that as drive shaft 36, powered by main electric motor 38, rotates drive gear 42, intermeshing ring gear 44 is brought in rotation therewith. Under the radially outward biasing force of the coil springs 68, the spherical balls 70 forcibly engage into the corresponding registering radially inward recesses 72 of ring gear 44, thus providing releasable frictional interlock engagement between ring gear 44 and discoid casing 64. As casing 64 is brought into rotation by its interlock engagement with ring gear 44, integral small diameter gear wheel 74 is concurrently brought into rotation. Since gear wheel 74 and tensioning gear 46 intermesh with one another (FIG. 16), gear 46 is concurrently brought into rotation. Accordingly, the strap end portion locked into shaft slit 56a can become progressively wound around the intermediate body portion of tensioning shaft 56, under power from the main electric motor 38.

However, once the strap or belt has been sufficiently wound around tensioning shaft 56, resistance is felt due to the strap that has become already substantially tightened around the load. At that time, beyond a set torque threshold—adjustable by rotating set screws 71 inside radial recesses 66—, the radial springs 68 inside the clutch casing 64 will yieldingly move radially inwardly, thus releasing the frictional interlock between the discoid casing 64 and the ring gear 44. This torque threshold may be within the range of about 1360 to 2270 kilograms, and preferably about 1810 kg.

The clutch 62 has therefore come into action, whereas rotational power transmitted from drive gear 42 to ring gear 44 is no longer able to be transmitted to tensioning shaft gear 46, since intermeshing gear 74—being integral to now stationary discoid clutch casing 64—does not rotate anymore.

Therefore, with the present device, once the set tightening load for the load securing strap has been reached, power from the motor 38 will stop being transmitted to the strap tightening shaft 56.

Moreover, the tightened strap will remain taut by the pawl 57 having engaged the ratchet gear 54. A biasing spring 59 (FIG. 5) carried by frame wall 40c and connected to pawl 57, prevents pawl 57 from accidentally releasing the selected peripheral recess 54a of the ratchet gear 54.

Figure 13A:
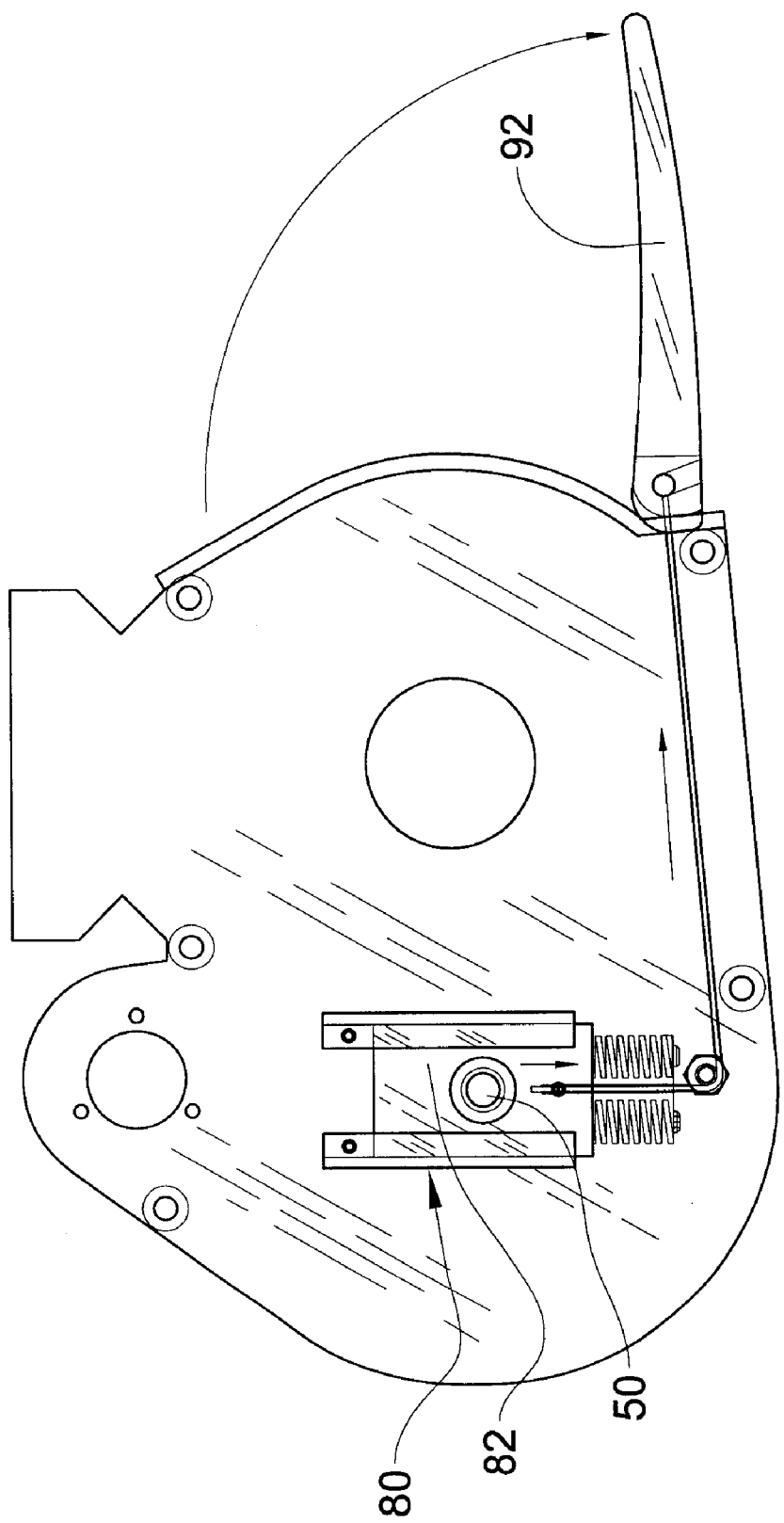
FIG. 13a is similar to FIG. 13, but with the handle clutch being engaged.

Manual override of the strap tightening can be achieved by actuating a clutch release means 80 shown in FIGS. 3 and 13 of the drawings. Clutch release means 80 includes a slider plate 82, integral to the inner end of gear shaft 50, and a pair of cross-sectionally L-shape guide rail members 84a, 84b, anchored to the outer face of frame wall 40b and slidingly retaining the slider plate 82 therebetween. Rails 84a, 84b, extend parallel to one another, in directions both normal to a virtual line joining shafts 50 and 52, and parallel to a virtual line joining shafts 50 and 36a.

Slider plate 82 is biased into its operative normal position, where ring gear 44 and drive gear 42 intermesh, by a pair of coil springs 86, being integrally supported to main frame leg 40b by a bracket 88.

A metallic cable 90, e.g. of a size about 1.6 mm in diameter, is connected at one end to the end portion of slider plate 82 adjacent the biasing springs 86, and at the other end to a clutch release handle member 92. By actuating handle member 92, cable 90 is pulled, thus bringing slider plate 82 into motion against the bias of coil springs 86. The pulling force of cable 90 brings in effect the shaft 50 away from the drive shaft 36a, and therefore the whole ring gear 44 away from the drive gear 42, whereby gears 42 and 44 come to release each other so that no gear intermeshing occur therebetween. This release of the intermeshing between gears 42 and 44 therefore provides release in the strap tensioning at the level of tensioning shaft 56.

More particularly, handle 92 defines a pivotal yoke end 92a, pivotally mounted to main frame 40. Cable 90 extends freely through a main frame flange 40f, extending orthogonal to main frame wall 40b, and joins with an anchor stud 92b of handle 92 proximate pivotal yoke end 92a. Main frame flange 40f forms a seat for the handle free inner end 92c, intermediate pivot mount 92a and cable anchor stud 92b. Accordingly, as handle 92 is brought downwardly outwardly from its generally upright condition shown in FIG. 13, the handle inner end 92c frictionally engages seat 40f, thus moving studs 92a and 92b away from one another, thus pulling cable 90 therewith. A sliding corner shoulder 94 is preferably mounted to wall 40b proximate bracket 88, for sliding engagement by cable 90, to enable location of handle 92 to be more conveniently laterally of the tightening unit 34 as shown in FIG. 13, rather than beneath same.

Manual release of the clutch release handle 92 brings once again the gear shaft 50 into operative position, since shaft 50 is able to yield to the bias of the coil springs 86.

Should there be a power shortage or a mechanical breakdown of the motor, the automatic system can be deactivated and the tightening system operated manually. The tightening device housing is quite compact, having for example the following dimensions: 20×20×25 centimeters (cm). The main single motor that drives all the tightening devices of a given trailer, may have for example the following dimensions: 15×17.5×37.5 cm. The strap tightening devices and the motor can be mounted onto any type of trailer for the transportation of goods.

The present load tightening system is particularly well suited—but not limited to pallet-supported commercial articles.

I claim:

1. A strap tightening system for use in securing a load with a wrap-around flexible strap over a flat bed open trailer, said system comprising:

at least one strap tensioning unit, including:
   a) a main frame, to be mounted to the trailer;
   b) a strap winding member, rotatably mounted to said main frame and to be lockingly engageable by one end portion of the strap;
   c) a gear assembly, rotatably mounted to said main frame;

a motor, to be mounted to the trailer at a distance from said tensioning unit and to be connected to a power supply;

a clutch assembly, operatively interconnecting said gear assembly and said strap winding member; and a drive shaft, operatively interconnecting said tensioning unit gear assembly and said motor, said drive shaft bringing said strap winding member to rotate upon actuation of said motor and rotation of said gear assembly and said clutch assembly; wherein upon the load applied by the strap onto said strap winding member exceeding a set load threshold, said clutch assembly disconnects said gear assembly from said strap winding member, whereby transmission of power from said drive shaft to said strap winding member is interrupted.

2. A strap tightening system as in claim 1, further including a releasable safety ratchet and pawl assembly, mounted to said main frame and cooperating with said strap winding member, said safety ratchet and pawl assembly preventing said strap winding member from unwinding once said set load threshold has been exceeded.

3. A strap tightening system as in claim 2, further including a rail member, said rail member including a first portion, to be anchored to the trailer flat bed in a fore and aft direction, and a second portion, slidingly retaining said strap tensioning unit frame, wherein the relative position of said strap tensioning unit can be slidingly adjusted along the length of the trailer in accordance with the relative position on the trailer bed of the load to be secured.

4. A strap tightening system as in claim 3, wherein there are at least a few strap tensioning units, located spacedly from one another and adjustably movable relative to one another along said rail member.

5. A strap tightening system as in claim 2, further including a manual clutch release member, for manually disconnecting said gear assembly from said strap winding member.

6. A strap tightening system as in claim 2, further including a manual strap tightening device, associated with said strap winding member, for tightening the strap independently of said drive shaft.

7. In combination, an open trailer having a flat bed, and a strap tightening system securing a loud with a wrap-around flexible strap over said flat bed, said system comprising:

at least one strap tensioning unit, including:

a) a main frame, mounted to the trailer;

b) a strap winding member, rotatably mounted to said main frame and lockingly engageable by one end portion of the strap;

c) a gear assembly, rotatably mounted to said main frame;

a motor, anchored to the trailer at a distance from said tensioning unit and to be connected to a power supply;

a clutch assembly, operatively interconnecting said gear assembly and said strap winding member; and a drive shaft, operatively interconnecting said tensioning unit gear assembly and said motor, said drive shaft bringing said strap winding member to rotate upon actuation of said motor and rotation of said gear assembly and said clutch assembly; wherein upon the load applied by the strap onto said strap winding member exceeding a set load threshold, said clutch assembly disconnects said gear assembly from said strap winding member, whereby transmission of power from said drive shaft to said strap winding member is interrupted.

8. A strap tightening system as in claim 2, further including an adjustment member, mounted into said clutch assembly for adjusting the magnitude of said set load threshold.

9. A strap tightening system as in claim 8, wherein the range of said set load threshold is between about 1360 and 2270 kg.

10. A strap tightening system as in claim 9, wherein said set load threshold is about 1810 kg.

11. A load tightening device for use in securing a load with a wrap-around flexible strap over a flat bed trailer, said device comprising:

a main rigid frame, to be anchored to the trailer;

a strap winding member, rotatably mounted to said main rigid frame and to be connected to the strap for winding the latter;

power means, for power operating said winding member to wind the strap;

power transmission means, operatively interconnecting said winding member and said power means;

clutch means, deactivating said power transmission means once the torque applied by the strap onto said strap winding member exceeds a set load threshold and said strap winding member reaches a threshold cranked state; and lock means, maintaining said strap winding member in its said threshold cranked state once said power means is deactivated.

12. A strap tightening system as in claim 2, wherein said gear assembly includes a ring gear, a drive gear integral to said drive shaft and intermeshing with said ring gear; and wherein said clutch assembly includes a clutch casing, mounted radially inward of said ring gear, said clutch casing including a number of radial recesses, a biasing member fully engaged into each of said radial recesses, and a bearing member mounted into each of said radial recesses radially outwardly of said biasing member, said ring gear defining a radially inner edge portion having a number of cavities in register with corresponding ones of said radial recesses, each of said ring gear cavities sized to complementarily accommodate a fraction of a corresponding bearing member, each said bearing member biased by a corresponding one of said biasing members radially outwardly toward and against a corresponding one of said ring gear cavities, said set load threshold being a function of said biasing member.

13. A strap tightening system as in claim 12, further including load adjusting set screws, each of said set screws mounted into a corresponding one of said radial recesses radially inwardly of said biasing member, said set screws enabling an operator to manually adjust said set load threshold.

14. A strap tightening system as in claim 13, wherein the range of said set load threshold is between about 1360 and 2270 kg.

15. A strap tightening system as in claim 14, wherein said set load threshold is about 1810 kg.

16. A load tightening system as in claim 11, wherein said power transmission means includes a ring gear, a drive gear integral to said power means and intermeshing with said ring gear; and wherein said clutch means includes a clutch casing, mounted radially inward of said ring gear, said clutch casing including a number of radial recesses, a biasing member fully engaged into each of said radial recesses, and a bearing member mounted into each of said radial recesses radially outwardly of said biasing member, said ring gear defining a radially inner edge portion having a number of cavities in register with corresponding ones of said radial recesses, each of said ring gear cavities sized to complementarily accommodate a fraction of a corresponding bearing member, each said bearing member biased by a corresponding one of said biasing members radially outwardly toward and against a corresponding one of said ring gear cavities, said set load threshold being a function of said biasing member.

17. A load tightening system as in claim 16, further including loud adjusting set screws, each of said set screws mounted into a corresponding one of said radial recesses radially inwardly of said biasing member, said set screws enabling an operator to adjust said set load threshold.

18. A load tightening system as in claim 17, wherein the range of said set load threshold is between about 1360 and 2270 kg.

19. A load tightening system as in claim 18, wherein said set load threshold is about 1810 kg.

* * * * *